US00RE40923E

(19) United States
(12) Reissued Patent
Anderson et al.

(10) Patent Number: US RE40,923 E
(45) Date of Reissued Patent: Sep. 29, 2009

(54) SIMPLIFIED DATA LINK PROTOCOL PROCESSOR

(75) Inventors: Jon Anderson, Brielle, NJ (US); Bharat Tarachand Doshi, Holmdel, NJ (US); Subrahmanyam Dravida, Shrewsbury, MA (US); Enrique Hernandez-Valencia, Highlands, NJ (US); Murali Krishnaswamy, Piscataway, NJ (US); James S. Manchester, Freehold, NJ (US)

(73) Assignee: Agere Systems Inc., Allentown, PA (US)

(21) Appl. No.: 10/417,013

(22) Filed: Apr. 16, 2003

Related U.S. Patent Documents

Reissue of:
(64) Patent No.: 6,263,443
Issued: Jul. 17, 2001
Appl. No.: 08/947,538
Filed: Oct. 11, 1997

(51) Int. Cl.
*G06F 11/14* (2006.01)

(52) U.S. Cl. ..... 370/474; 370/466; 370/392; 713/160; 713/190; 713/201; 709/250; 714/508

(58) Field of Classification Search ..... 709/250; 713/160, 190, 201; 714/508; 370/250, 392, 370/466

See application file for complete search history.

(56) References Cited

U.S. PATENT DOCUMENTS 5,563,890 A * 10/1996 Freitas ..... 370/99
5,568,486 A * 10/1996 Huscroft et al. ..... 370/94.2
5,572,515 A * 11/1996 Williamson et al. ..... 370/17
5,729,826 A * 3/1998 Gavrilovich ..... 455/11.1
5,742,765 A * 4/1998 Wong et al. ..... 395/200.6
5,780,474 A * 7/1998 Peglion et al. ..... 380/21
5,790,557 A * 8/1998 Lee et al. ..... 370/535
5,870,474 A * 2/1999 Wasilewski et al. ..... 380/21
5,894,517 A * 4/1999 Hutchison ..... 380/9
5,905,873 A * 5/1999 Hartmann et al. ..... 395/200.79
5,936,965 A * 8/1999 Doshi et al. ..... 370/469
6,018,530 A * 1/2000 Chakravorty ..... 370/471
6,041,054 A * 3/2000 Westberg ..... 370/389

OTHER PUBLICATIONS

"Applied Cryptography, Second Edition", Bruce Schneier, pp. 294–295, 1996.*
Microsoft Press, "Computer Dictionary" Second Edition, p. 379, 1994.*

* cited by examiner

*Primary Examiner*—Reba I Elmore
(74) *Attorney, Agent, or Firm*—Mendelsohn, Drucker & Associates, PC; Steven Mendelsohn

(57) ABSTRACT

A simplified data link protocol which may be implemented in a very high-speed transmission system, e.g., SONET, processes a datagram received from an IP facility according to QoS considerations and scrambles a datagram before it is again scrambled by a transmission system, e.g., a SONET transmitter, to ensure that the pattern of a user's data does not match the transmission scrambling pattern. The data link protocol scrambler also employs a novel synchronization scheme. We also use a pointer system which identifies the location of a datagram in a frame to eliminate flags and the need to process user data to ensure that it does not contain and a boundary flag.

24 Claims, 6 Drawing Sheets

1000

600

SIMPLIFIED DATA LINK PROTOCOL PROCESSOR

Matter enclosed in heavy brackets [ ] appears in the original patent but forms no part of this reissue specification; matter printed in italics indicates the additions made by reissue.

FIELD OF THE INVENTION

The invention relates to the transmission of data over a high-speed data link, e.g., a SONET facility, and more particularly relates to a protocol governing the transmission of a datagram received from network elements employing the Internet Protocol (IP) or a similar protocol.

BACKGROUND OF THE INVENTION

Optical systems use binary line coding for digital transmissions, and scramble data that will be transmitted to ensure a random distribution of logical ones and zeroes to maintain line synchronization. Such scrambling also ensures that so-called pseudo-random, non-random sequence frequency components are removed from the transmitted stream of data as a way of improving the transmission signal-to-noise ratio.

As is well-known, an absence of incoming logical ones (or zeroes) for an appreciable amount of time, e.g., 2.3 μs, could cause a receiver to lose such synchronization. Some data systems, e.g., a Synchronous Optical NETwork SONET), deal with this problem, by generating a particular pattern of logical ones and zeroes and combining the logical pattern with a user's bit stream so that an appropriate mix of such ones and zeroes are transmitted over the transmission medium. The particular pattern that is combined with the user's bit stream is called a scramble. At the opposite end of the transmission medium, a receiver combines with the transmitted bit stream with the particular pattern to recover the user's data. The particular pattern, more particularly, is generated at the transmitter and supplied to one input of an "Exclusive Or" circuit, and the user data is supplied to another input of the circuit. The output of the Exclusive Or is transmitted to the destination receiver which detects the incoming ones and zeroes forming the incoming data and supplies the latter to another "Exclusive Or" circuit to recover the user's data. When there is an absence of user data to send at the transmitter, then the "Exclusive Or" outputs the aforementioned pattern, which is transmitted to the receiver, which uses the received data to maintain synchronization necessary for accurate detection of incoming ones and zeroes forming the pattern. Similarly, the receiver performs an Exclusive Or between the detected incoming data and the aforementioned particular pattern, and outputs a stream of zeroes, which is the result of the same signal pattern of ones and zeroes that is supplied to both inputs of Exclusive Or. Thus, a sufficient stream of data is transmitted to the receiver to allow the receiver to maintain the synchronization necessary to detect accurately incoming ones and zeroes whenever there is absence of user data to transmit.

Disadvantageously, as will be detailed below, such synchronization may be disrupted even though such scrambling is being used in SONET, as may happen when a user's packet is larger than the scrambler period. For example, a user, inadvertently or otherwise, could insert the scrambler pattern in the user's datagram, and if such bits are aligned with the scrambler pattern, then the Exclusive Or would output a stream of zeroes, which could cause the system to declare a loss of signal or a loss of timing.

In prior data systems, e.g., a SONET system implementing the well-known HDLC protocol, the boundaries of a datagram, or data packet containing user data are marked by leading and trailing flags having a predetermined pattern, as is shown in FIG. 1, in which flags 10 and 12 define the start and end of packet 11. Such systems recognize that user data could contain a series of ones and zeroes defining a flag—which could cause a receiver encountering such an incorrect flag to mistakenly conclude that the incoming datagram/packet ends at that point. The receiver may also conclude mistakenly that the succeeding data belongs to a next datagram/packet.

To deal with this problem, prior systems check each byte of user data and change each user byte resembling a flag to a so-called user flag 13 (UFLG) by appending dummy bits to the byte. A receiver, in turn, strips off the added bits. It can be appreciated that the task of checking each byte of user data to determine if it resembles a boundary flag is indeed a waste of system resources. Moreover, it is very difficult to perform such checking at very high data rates, e.g., a data rate of 2.5 Gbps.

Moreover, data systems, especially data systems which transmit and receive via the Internet, do not currently provide a mechanism that differentiates between different data services so that the transmission of data may be engineered on a Quality of Service basis (QoS) for multimedia traffic, including, e.g., data characterizing video, audio, voice, etc. For the most part, the Internet treats data associated with different services the same.

SUMMARY OF THE INVENTION

We address the foregoing using what we call a simplified data link protocol which processes a datagram based on QoS considerations and which scrambles a datagram before it is again scrambled by a transmission system, e.g., a SONET transmitter, to ensure that the pattern of a user's data does not match the transmission scrambling pattern. We also use a pointer system which identifies the location of a datagram in a frame to eliminate flags and the need to process user data to ensure that it does not resemble a boundary flag.

These and other aspects of the invention will be appreciated from the following claims, detailed description and accompanying drawings.

DETAILED DESCRIPTION

Figure 2:
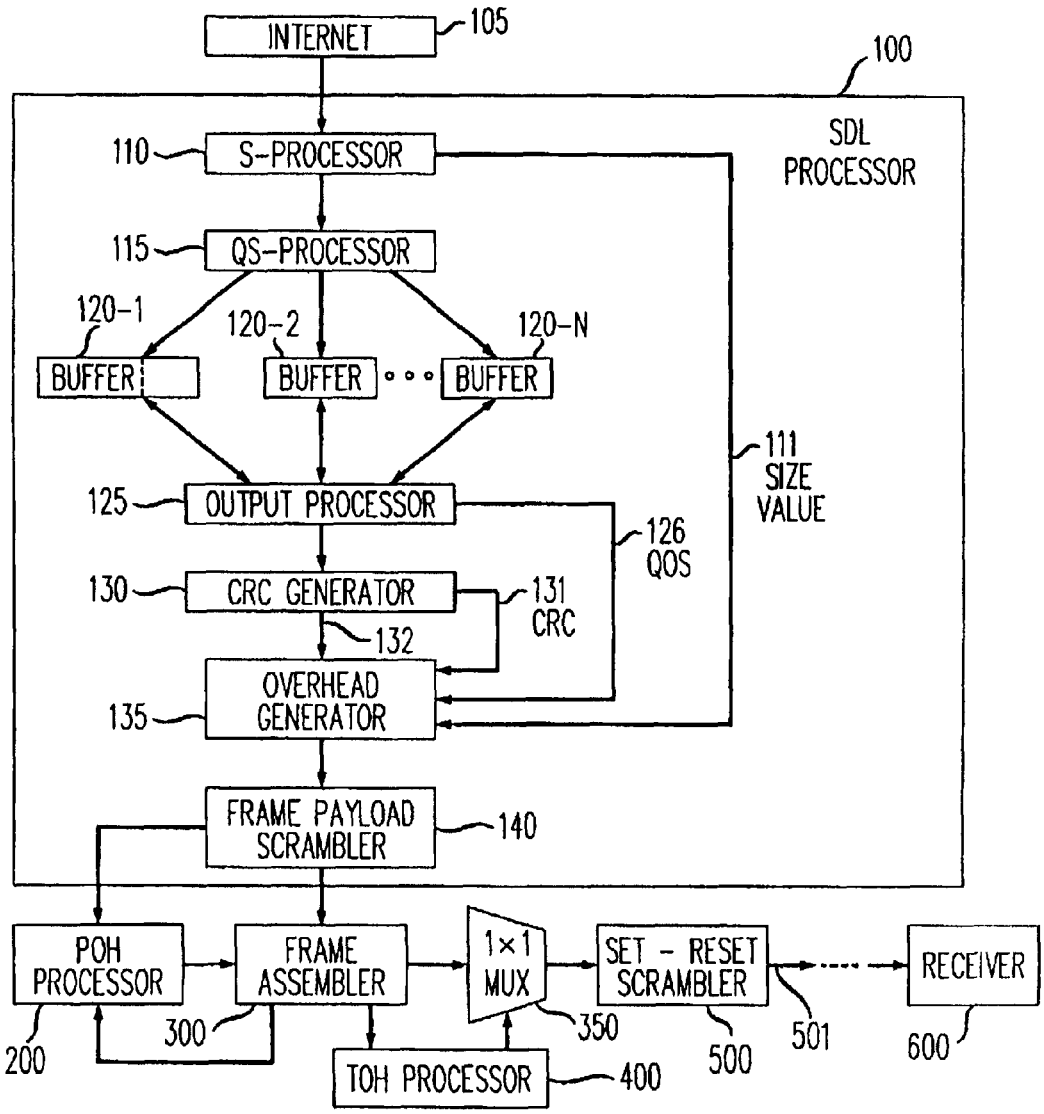
FIG. 2 is a block diagram of a simplified data link transmitter system in which the principles of the invention may be practiced.

The Simplified Data Link (SDL) shown in FIG. 2 includes S-processor 110 which provides an interface for receiving a datagram from an Internet facility 105, such as an IP gateway (router), computer etc., and which determines the size (i.e., number of bytes) of the incoming datagram. The S-processor may do this by either (a) counting each byte forming the incoming datagram, or (b) checking the datagram header for such information if the datagram was formed in accordance with the so-called IP version IV protocol. For example, the IP version IV protocol includes the size of the datagram in the datagram header. If that is the case, then S-processor 110 may simply query the datagram header. S-processor 110 then supplies via path 111 a value indicative of the size of the datagram to overhead generator 135, which appends that value and other information to the accompanying datagram header, as will be explained below. The incoming datagram is then fed to QoS processor 115, which determines the level of priority that should be accorded to the incoming datagram. QoS processor 115 stores a datagram associated with the highest level of quality in data buffer 120-1; and stores a datagram associated with the next highest level of priority in data buffer 120-2 and so on. QoS processor 115 may determine such level of priority in a number of different ways. For example, if, as mentioned above, the datagram was formed in accordance with the IP version IV protocol, then the datagram header contains data indicative of the type of service associated with the datagram. If that is the case, then the datagram header may contain QoS properties. QoS processor 115 using either the identified type of service or QoS properties determines the level of priority associated with the datagram and stores the datagram in the appropriate one of the buffers 120-1 through 120-N. Note that one or more of the buffers 120-1 through 120-n may be a straight through path to output processor 126, as represented by the dashed line in buffer 120-1—meaning that the datagram is not stored in the buffer but is passed straight through the buffer to output processor 125.

Each of the buffers 120-1 through 120-N includes a scheduling processor (not shown) which contends, on a priority type basis, for access to output processor 125. Thus, for example, if a number of the buffers contend for access to output processor 125 at the same time, then the buffer associated with the highest level of priority is granted such access. Specifically, each contention processor cancels its contention if it determines that a buffer of a higher priority is also contending for access to processor 125. Thus, output processor 125 receives the datagram from the buffer 120-i that wins such contention, and forwards the datagram as it is received to conventional CRC generator 130. Alternatively, processor 125 may receive a datagram from a buffer 120-i according to some other QoS scheduling policy.

Output processor 125 also forwards a value indicative of the QoS that is to be accorded to the datagram to overhead generator 135 via path 126. CRC generator 130, which may be, for example, a conventional high-speed processor/computer, generates a conventional CRC code across the contents forming the datagram and supplies the CRC to overhead generator 135 via path 131 and also supplies the datagram to overhead generator via path 132. Overhead generator 135, in turn, appends the information that it respectively receives via paths 111, 126 and 131 to the datagram header, all in accordance with an aspect of the invention. It then supplies the resulting datagram to frame payload scrambler 140.

As discussed above, the aforementioned synchronization process may be disrupted irrespective of the fact that a scrambler circuit is used. As mentioned, a disruption may occur when the user's packet is larger than the scrambler period and when the pattern of the user's data matches the scrambling pattern. As was also discussed above, it is possible for a user to insert the scrambler pattern in the user's datagram and if those bits are aligned with the scrambler pattern, then the scrambler circuit would output a stream of zeroes (or all ones), which will cause the transmission system to declare a loss of signal or a loss of timing.

We deal with this problem by using another scrambler having a very large period between the user's data stream and SONET scrambler in particular, we scramble the bits forming the datagram that is being processed by SDL processor 100 before the datagram is supplied to a set/reset scrambler 500 that is used to ensure synchronization. In this way, the bits forming the datagram are scrambled twice, thereby making it very unlikely that the scrambled pattern will match the scrambler pattern that set-reset scrambler 500 uses to scramble the assembled frame, even if the datagram contains that scrambler pattern. Accordingly then, as will be discussed below in detail, frame payload scrambler 140 scrambles the bits forming the datagram it receives from overhead generator 135 and outputs the result to conventional SONET 300 frame assembler and supplies, in a manner discussed below, the code that it used to scramble the datagram bits including the header to conventional SONET Path Overhead processor 200.

Figure 3:
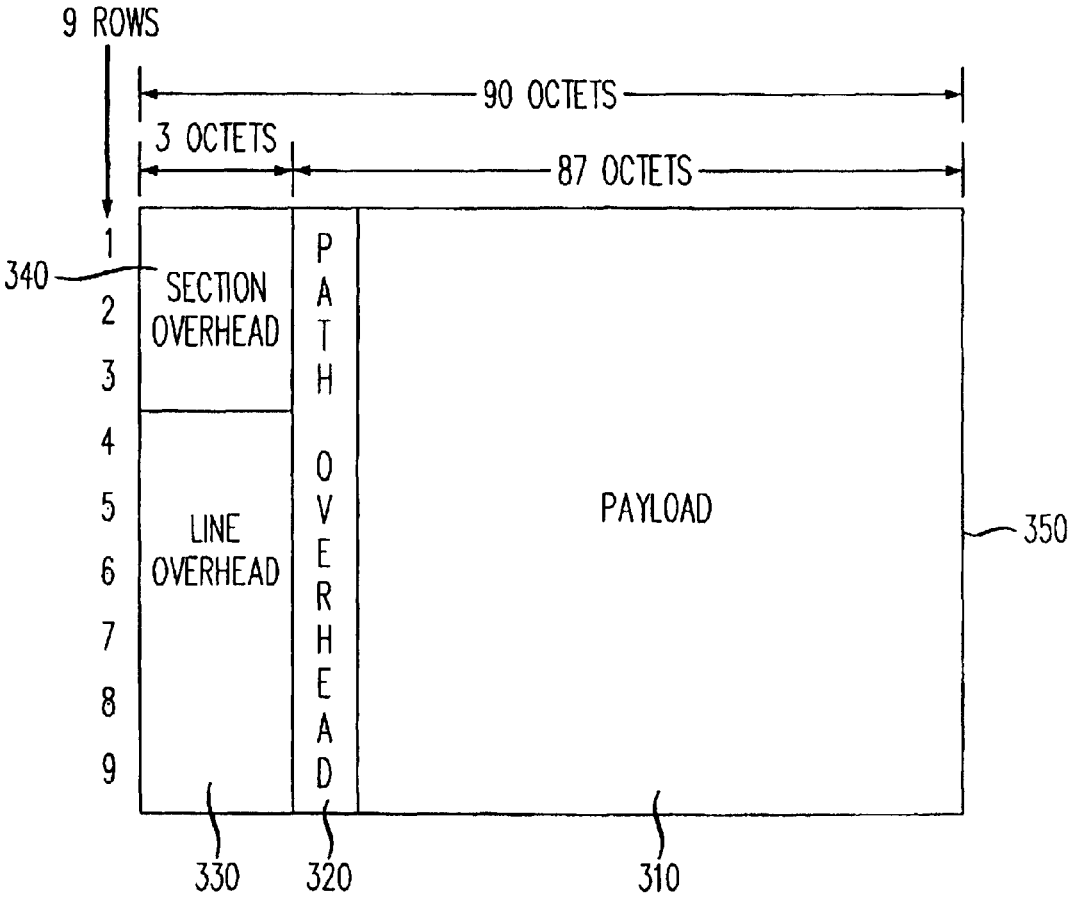
FIG. 3 is a layout of a SONET (STS-1) Synchronous Transport Signal Level 1.

Briefly, referring to FIG. 3, a SONET frame 350 comprising nine rows of 90 octets is formed from four sections that include the payload (datagram(s)) 310, Path OverHead (POH) bytes 320, line overhead bytes 330 and section overhead bytes 340. Specifically, the first three columns contain transport overhead which is divided into 27 octets such that 9 octets are allocated for section overhead 340 and 18 octets are allocated for line overhead. The other 87 columns, which includes the path overhead, comprise the total payload (also referred to as the Synchronous Payload Envelope (SPE)). Frame assembler 300 operating in conjunction with POH processor 200 thus assembles the total payload of the next frame that is to be transmitted over the optical network (represented in FIG. 2 by optical path 501). It is likely that the payload of a frame may be composed of one or more datagrams including a partial datagram. That is, part of a datagram was included in a previous frame that was transmitted over the optical network and the remainder of the datagram is included in the current frame that is being assembled, in which such remainder will start the payload of the current frame. The next datagram will then be appended to that remainder. To distinguish the start of a new datagram in the SPE, a pointer may be included in the POH to point to the first byte of the new datagram, in which the header of the datagram includes the number of bytes (size) forming the datagram as determined by S-processor 110. Thus, the receiver of the frame may determine the location of the first new datagram in the SPE and the number of data bytes forming the datagram. If the SPE contains two new datagrams, one immediately following the other, then the receiver may easily determine from the location and size information associated with the first datagram the location of the second datagram in the SPE.

Thus, frame assembler 300 assembles the datagram that it receives from scrambler 140 into an SPE in the described manner. In doing so, it supplies the location of the datagram to POH processor 200 if that datagram is the first new datagram in the frame that is being assembled. POH processor 200 includes that location with other path information in the POH overhead and supplies the POH overhead to assembler 300 for insertion in the assembled frame. Similarly, frame assembler 300 and conventional Transport Overhead (TOH) processor 400 cooperate with one another to form the transport overhead section of the frame. Assembler 300 and processor 400 then respectively supply the frame payload and transport overhead section of the frame to 1×1 MUX 350, which outputs the final version of the frame row by row to conventional set-reset scrambler 500, which then scrambles the information for synchronization purposes, as discussed above. Scrambler 500 then transmits the scrambled result over optical network 501 for transmission to receiver 600.

Figure 4:
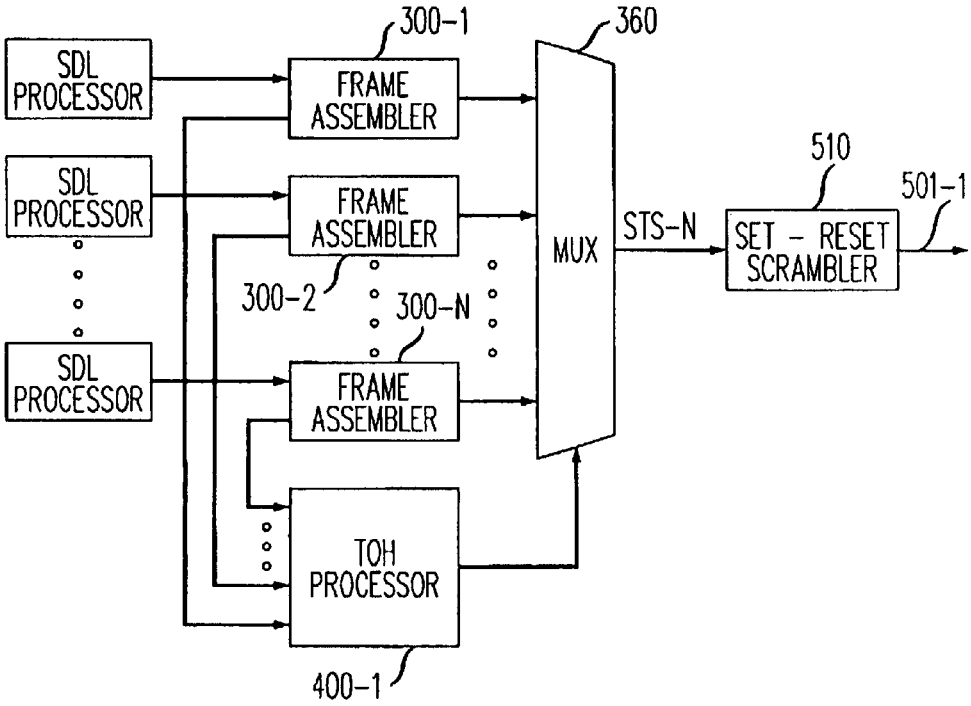
FIG. 4 illustrates an alterative arrangement for building a Synchronous Payload Envelope bearing a plurality of STS frames.

FIG. 4 illustrates an alternative embodiment of a system employing the principles of the invention, in which a number of STS frames are formed into an STS N payload, and in which each frame assembler 300-i is preceded by a Simple Data Link processor.

Figure 5:
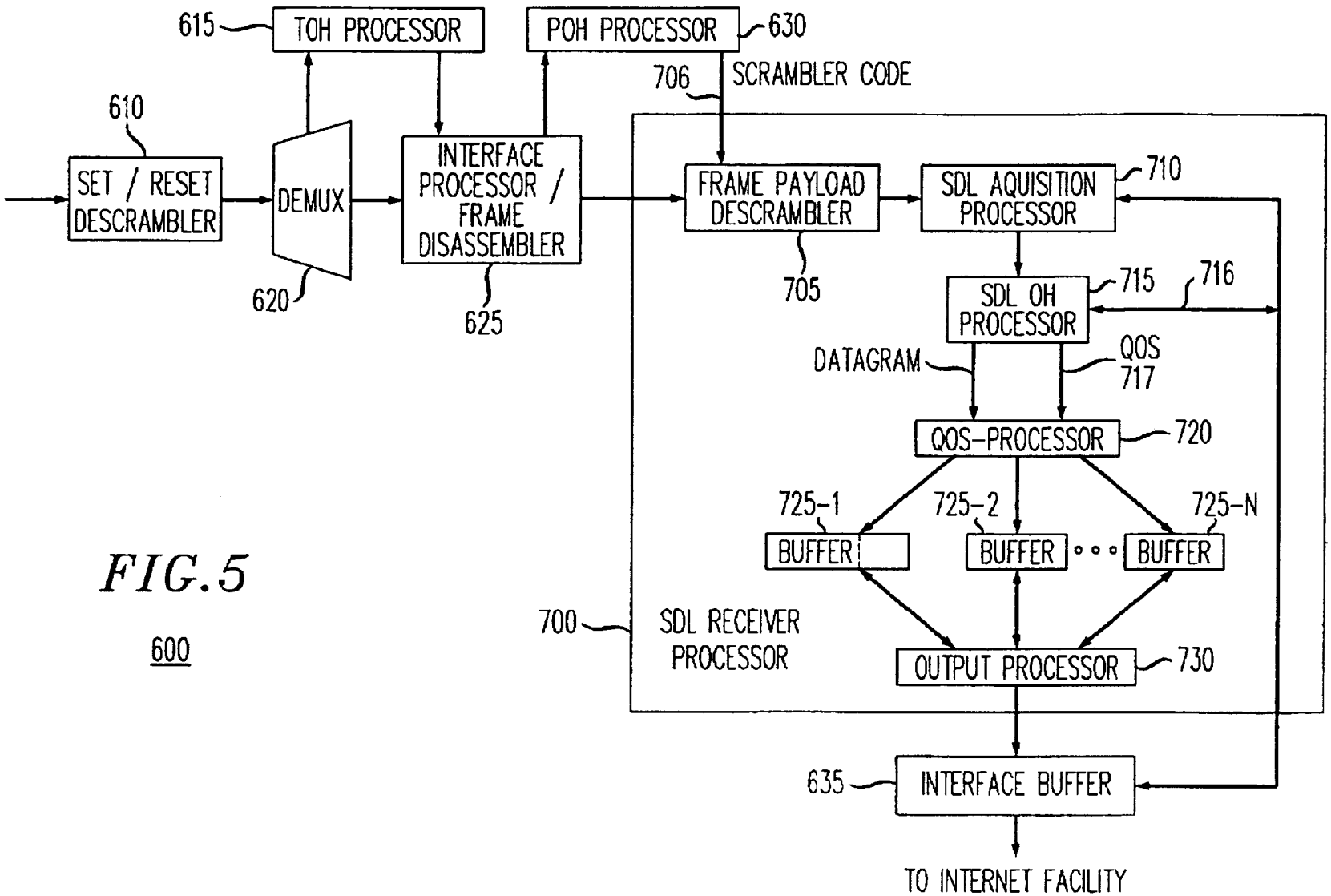
FIG. 5 is a block diagram of a simplified data link receiver system in which the principles of the invention may be practiced.

The receiver that is the recipient of a SPE that the transmitter of FIG. 2 transmits over optical network 501 is shown in FIG. 5. The receiver includes conventional set/reset descrambler 610 which descrambles the data that has been scrambled by set/reset scrambler 500 (FIG. 2). The output from the latter circuit is supplied to demultiplexer 620, which may be a 1×1 demultiplexer if the incoming signal is a so-called concatenated signal. Otherwise Mux 620 may be a 1×N demultiplexer, which would demultiplex the incoming data stream from descrambler 610 into a plurality of independent data streams forming the incoming data stream. As a result of such demultiplexing, the transport overhead signals are supplied to TOH processor 615 and the accompanying payload is supplied to conventional interface processor/frame disassembler circuit 625. TOH processor 615 removes the datagram pointer value from the transport overhead bytes and supplies that value to circuit 625. The latter circuit then strips off the path overhead (POH) bytes that form part of the SPE (as shown in FIG. 3) and supplies the path overhead bytes to conventional POH processor 630. The latter processor, inter alia, strips the scrambler code off the path overhead in the manner discussed below and supplies the code to frame payload descrambler 705 of SDL receiver processor 700. Descrambler 705 descrambles the payload using the received code to recover the datagram that overhead generator 135 (FIG. 2) supplies to frame payload scrambler 140. Descrambler 705 then supplies the descrambled payload to SDL acquisition processor 710, which synchronizes on the SDL overhead CRC value generated by CRC generator 130 (FIG. 2) over the datagram. Processor 710 does this so that the value of the CRC that it generates over what it believes to be the datagram will equal the generator 130 CRC value. If such CRC values are not equal, then processor 710 moves the boundaries (or window) covering what it hopes is the datagram by one bit and recalculates the CRC. If the latter CRC equals the generator 130 CRC, then processor 710 concludes that the new boundaries encompass the datagram. If not, then processor 710 again moves the boundaries by one bit and again recalculates the CRC. Processor 710 continues this process until the CRC that it calculates equals the CRC received in the POH. When that event occurs, then processor 710 knows such boundaries, and is thus able to verify the value of the length byte. Processor 710 then supplies the datagram to SDL overhead processor 715, which strips off the size and QoS bytes and supplies those values to paths 716 and 717, respectively. Processor 715 then supplies the datagram to QoS processor 720, which operates similar to QoS processor 115 (FIG. 2).

Specifically, (and similar to what has already been discussed in conjunction with FIG. 2) QoS processor 720 also determines the level of priority that should be accorded the datagram that it receives from processor 715, in which such priority is based on the QoS value that it receives via path 717. Similarly, QoS processor 720 stores a datagram associated with the highest level of quality in data buffer 725-1; stores a datagram associated with the next highest level of priority in data buffer 725-2 and so on. Similarly, one or more of the buffers 725-1 through 725-N may be a straight through path to output processor 730, as represented by the dashed line in buffer 725-1—meaning that the datagram is not stored in the buffer but is passed straight through the buffer to output processor 730.

Each of the buffers 725-1 through 725-N also includes a scheduling processor (not shown) which contends, on a priority type basis, for access to output processor 730. For example, if a number of the buffers contend for access to output processor 730, then the buffer associated with the highest level of priority is granted such access. Specifically, each contention processor cancels its contention if it determines that a buffer of a higher priority is also contending for access to processors 730. Thus, output processor 730 receives the datagram from the buffer 725-i that wins such contention, and forwards the datagram as it is received to a conventional interface buffer 635 that provides an interface between SDL receiver 700 and some other Internet facility, e.g., an Internet router. Alternatively, processor 730 may receive a datagram from buffer 725-i according to some other QoS scheduling policy.

Figure 6:
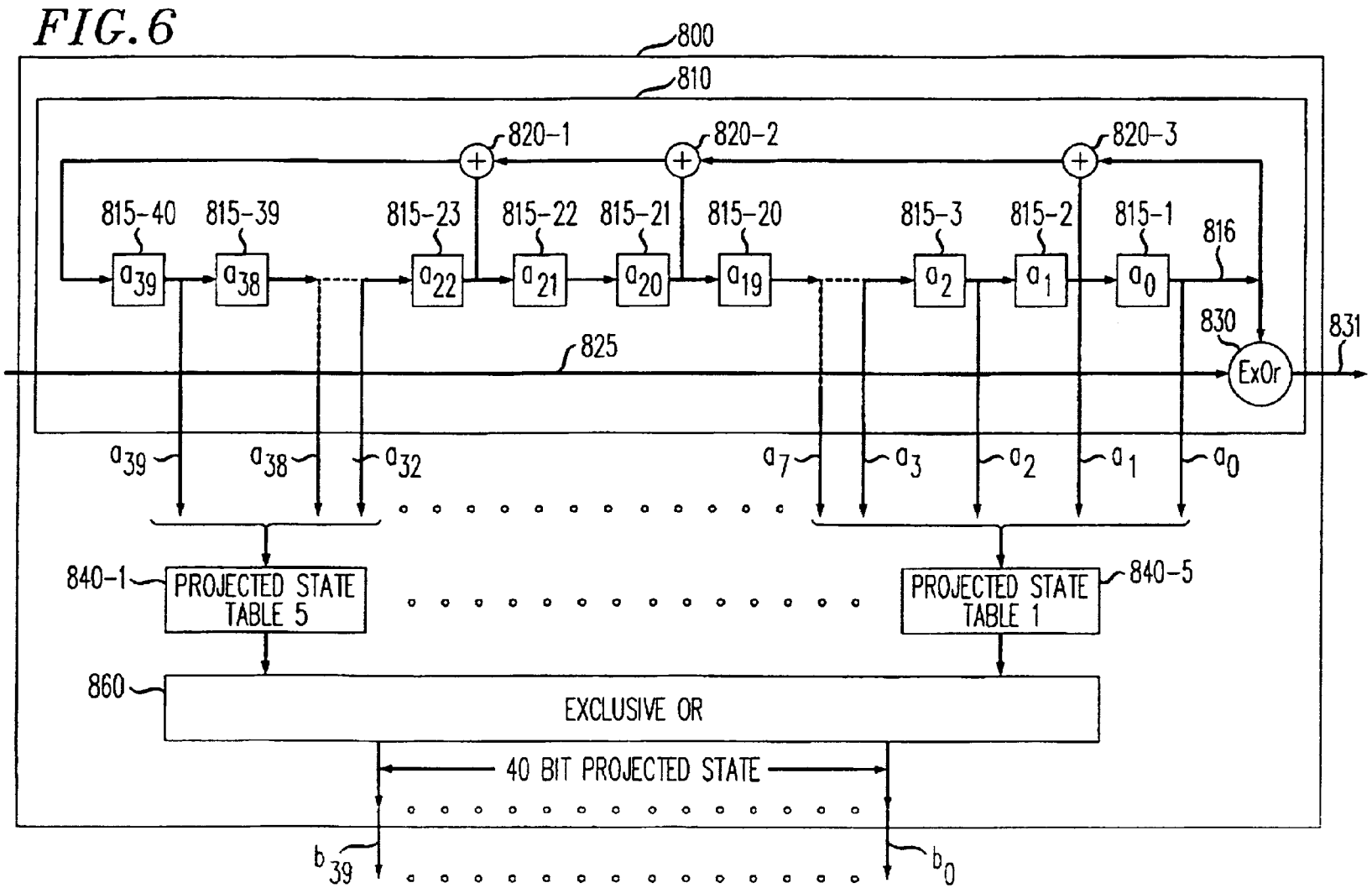
FIG. 6 is a block diagram of the frame payload scrambler of FIG. 2.

A block diagram of frame payload scrambler 140 used in the SDL processor at the transmitter is shown in FIG. 6. Frame payload scrambler 800 includes scrambler section 810 comprising a shift register whose operation is characterized by the following polynomial:

$$1+X^2+X^{19}+X^{21}+X^{40}$$

The polynomial function is implemented in scrambler 810 by a shift register formed from a plurality of register 815-1 through 815-40 that are driven by a system clock signal (not shown) to generate, in conjunction with the adder circuits 820-1 through 820-3, a random and continuous pattern of logical ones and zeros at the output 816 of register 815-1 (also shown as bit $a_0$). The random, continuous stream of logical ones and zeroes is presented to one input of Exclusive Or (Ex Or) circuit 830 via an extension of path 816. The data (bits) that are to be scrambled are supplied to another input of Ex Or circuit 830 via path 825. The scrambled result of the Ex Or is then supplied to path 831. In FIG. 6, input path 825 extends from overhead generator 135 and output path 831 connects to one input of frame assembler 300. It is noted that scrambler 810 is initialized at start up using a 40 bit data word in which at least one bit must be a logical one (non-zero).

To synchronize the descrambler circuit 705 that is in the receiver 600 (FIG. 5) with the scrambler 810 that is in the transmitter, scrambler 800 predicts (also referred to herein as "projects") what the state of transmitter scrambler 810 (i.e., the scrambler code) will be a predetermined number of bytes in the future and supplies that prediction/determination to the receiver so that the SDL receiver may be properly synchronized with the transmitter to properly descramble a received scrambled payload. Such a determination is periodically transmitted to the receiver SDL. Accordingly, then, the receiver may quickly restore synchronization with the transmitter whenever such synchronization has been interrupted.

Since a SONET frame (specifically the path overhead) has a limited amount of unused data bytes that may be used to transmit the aforementioned prediction/determination, which comprises, for example, five bytes of data, the predicted descrambling code is transmitted over two consecutive frames in one embodiment. Thus, the receiver may be out of synchronization for, at most, two frames. (It is understood that the descrambling code could be transmitted over one frame if the appropriate number of byte locations were available. In that case, then, the receiver would be out of synchronization for one frame.) More specifically, the so-called H4, Z3 and Z4 bytes of the path overhead are used to transport the predicted state to the receiver, in which a CRC code generated over the five byte state is also sent in one of those path overhead bytes.

Figure 7:
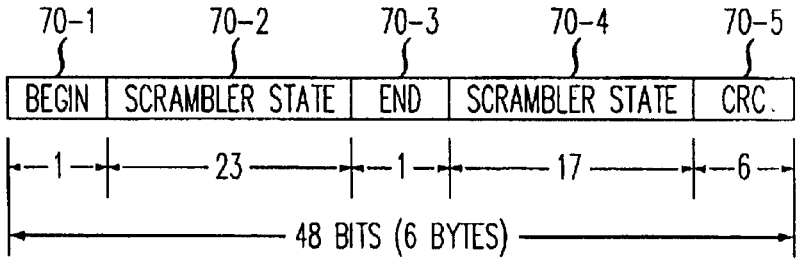
FIG. 7 illustrates the format of a descrambling code that the frame payload scrambler of FIG. 2 inserts in the path overhead section of a SONET frame.

An illustrative format for the scrambling/descrambling code is shown in FIG. 7 and includes fields 70-1 through 70-5. Field 70-1 contains a start/begin bit set to a logical one followed by field 70-2 containing 23 bits of the scrambling code (state). Fields 70-1 and 70-2 comprise three bytes which are inserted in the aforementioned fields of the path overhead of the first transmitted frame. Field 70-3 contains an end bit and is followed by field 70-4 containing the remaining bits of the five byte code. A CRC generated over the five byte code is inserted in field 70-5. The three bytes of data formed by fields 70-3 through 70-5 are inserted in the H4, Z3 and Z4 bytes of the path overhead that is inserted in a second succeeding transmitted frame. The POH processor 630 (FIG. 5) assembles the five byte code over the two frames and generates its own CRC and compares that CRC with the CRC that is received in the path overhead.

If the comparison is positive (passes) and the projected state characterized by the five bytes matches the current state at the receiver, then the POH processor 630 ignores the newly received projected state, which allows descrambler 705 (FIG. 5) to continue its descrambling using the current code or state. Similarly, POH processor 630 ignores that newly received state if the comparison is negative (fails), which, again, allows descrambler 705 to continue its descrambling using the current code or state. Also, if the comparison passes over three consecutive cycles, and the projected transmitter state does not match the current state at descrambler 705, then POH processor 630 supplies the latest transmitter projected state to descrambler 705, descrambler 705 then uses that state to descramble the newly received datagram payload.

Figure 1:
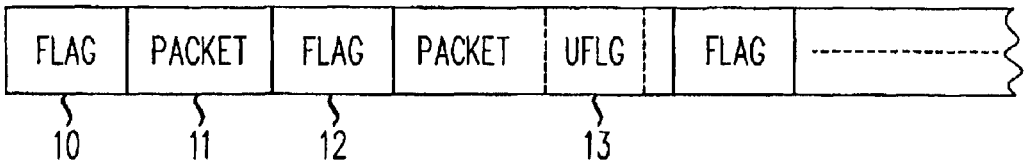
FIG. 1 (PRIOR ART)
FIG. 1 illustrates the way in which prior data systems delineate the boundaries of a transmitted datagrams and packets.

Returning to FIG. 6, the five byte predicted state is generated by accessing a location in each of the tables 840-1 through 840-5 each of which may be formed from, for example, a block of memory having 256 locations each location having 40 bits (5 bytes). In an illustrative embodiment of the invention, table 5 provides the most significant data and table 1 provides the least significant data. The address that is used to access the most significant table 840-1 is formed from the most significant bits outputted by scrambler 810, namely, bits $a_{39}$ through $a_{32}$, the address that is used to access the next significant table 840-2 is formed from the next group of significant bits outputted by scrambler 810, namely, bits $a_{31}$ through $a_{24}$, and so on. The most significant bits that the accessed tables output are passed through an Exclusive Or process 860 and that result is outputted as bit $b_{39}$ of the descrambling code. Similarly, the next most significant bits that the tables output are also passed through Exclusive or process 860 and that result is outputted as bit $b_{38}$ of the code word, and so on. The projected code word formed by bits $b_{39}$ through $b_0$ is then supplied to POH processor 200 (FIG. 1).

The data that is stored in each table may be generated off line using a scrambler similar to scrambler 810. Specifically, and referring to table 840-1, the entry that is inserted in the location that is accessed by the most significant address that may be formed from bits $a_{39}$ through $a_{32}$ is generated by respectively inserting the logical values for those bits (11111111) into registers 815-40 through 815-33 and zeroes in each of the other registers of the off-line scrambler and then clocking the scrambler to the projected state. The contents of the registers 815-40 through 815-1 at the predicted/projected state are then inserted in table 5 at location address 11111111. The logical values of the bits forming the next significant address in table 5, address 11111110, are then respectively loaded into regions 815-40 through 815-33 with zeroes in the other registers. The off-line scrambler 810 is then clocked to the projected state and the contents of register 815-40 through 815-1 are inserted at location 11111110 of table 5. This process is continued for each of the remaining address locations of table 5. A similar procedure is used to generate the entries for table 4. Specifically, and referring to table 840-4, the entry that is inserted in the location that is accessed by the most significant address that may be formed from bits $a_{31}$ through $a_{24}$ is generated by inserting the logical values for those bits (11111111) respectively into registers 815-32 through 815-25 and zeroes in each of the other registers of the off-line scrambler and clocking the scrambler to the projected state. The contents of register 815-40 through 815-1 at the predicted/projected state are then inserted in table 4 at location address 11111111. The logical values of the bits forming the next significant address in table 4, address 11111110, are then respectively loaded into registers 815-32 through 815-25 with zeroes in the other registers. The off-line scrambler is then clocked to the projected state and the contents of register 815-40 through 815-1 are inserted in table 4 at location 11111110. This process is also continued for each of the remaining address locations of table 4 (840-2).

The foregoing procedure is also applied to tables 3, 2 and 1 to populate those tables in the described manner. Other ways may be used to determine the projected state. For example, a transmitter may use two scramblers running in parallel such that a scrambler would operate on the current bits and the second scrambler would operate ahead of the first scrambler at the projected point. As another example, a single scrambler could be running at the projected point such that the output of the scrambler between the current bit and the projected bit is stored in a buffer for ExOring with the output.

Figure 8:
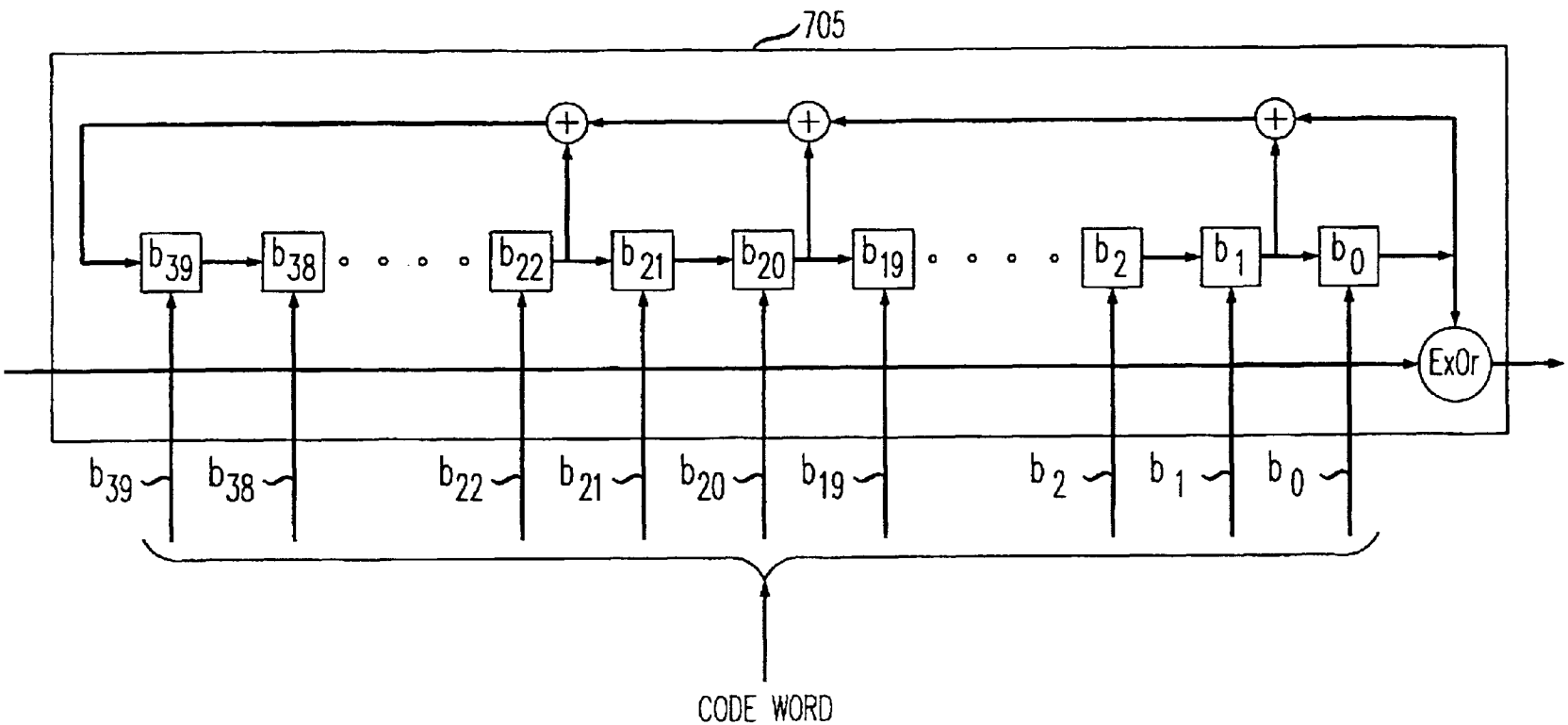
FIG. 8 is a block diagram of the frame payload descrambler of FIG. 5.

As mentioned above, the architecture of descrambler 705 is similar to scrambler 810, as can be seen from FIG. 8, and thus operates similarly. In particular, it can be seen from FIG. 8 that the bits forming the code word that POH processor 630 supplies to descrambler 705 via path 706 are loaded into register $b_{39}$through $b_0$, respectively. Descrambling 705 applies the code word to the payload that it receives from interface processor 625 and outputs the descrambled result via the ExOr circuit to SDL acquisition processor 710.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. Apparatus for processing, in accordance with a simplified data link protocol, a datagram received from an Internet facility and supplying the processed datagram to Synchronous Optical NETwork (SONET) apparatus for transmission over an optical path, said datagram being formed from a plurality of data bytes and being associated with a predetermined quality of service, said apparatus comprising a simplified data link processor for receiving the datagram from the Internet, assigning a size value to the datagram, in which the size value is determined as a function of the number of data bytes forming the datagram, and storing the datagram in a buffer selected as a function of a quality of service indicator indicative of a level of priority assigned to the datagram, in which the contents of the selected buffer are then processed at a level commensurate with the assigned priority level, the simplified data link processor including first apparatus for generating a cyclic redundancy code (CRC) over the datagram stored in a buffer currently scheduled for processing and inserting the CRC, quality of service indicator and size value in a header section of a datagram, and for then supplying the resulting datagram to second apparatus, the second apparatus being operative for receiving the data bits forming the resulting datagram and scrambling the bits of the datagram in accordance with a particular scrambling code and supplying the scrambled result to the SONET apparatus, the SONET apparatus including a frame assembler which assembles the scrambled result and associated path overhead information into a payload and a scrambler circuit which then scrambles the payload and associated path overhead information and outputs that scrambled result as a frame of data to the optical path.

2. The simplified data link apparatus of claim 1 wherein the process of scrambling the bits of the datagram in accordance with the particular scrambling code is characterized by a polynomial of $1+x^2+x^{19}+x^{21}+x^{40}$.

3. The simplified data link apparatus of claim 1 wherein the SONET apparatus further includes a path overhead processor which generates the path overhead information, such that the path overhead information includes a descrambling code derived as a function of the particular scrambling code.

4. The simplified data link apparatus of claim 1 wherein the SONET apparatus further includes a path overhead processor which generates the path overhead information such that the path overhead information includes a first part of a descrambling code derived as a function of the particular scrambling code and such that the path overhead information generated for a payload of a next succeeding frame includes a second part of the descrambling code.

5. Apparatus for processing a datagram received from Internet facilities and supplying the processed datagram to another transmission facility, said apparatus comprising a first scrambler for scrambling the datagram bits starting with a current scrambling code to a form a scrambled datagram and for determining a projected descrambling code that succeeds the current scrambling code by a predetermined number of bits and, and for including the projected descrambling code in the transmission of the scrambled datagram to a receiver, and at the receiver, receiving the scrambled datagram and forming the projected descrambling code into a scrambling code and descrambling the scrambled datagram as a function of the formed scrambling code.

6. A method of preventing loss of synchronization between a transmitter of data and a receiver of the data comprising the steps of receiving a plurality data bytes forming a data packet, scrambling the bits forming the data bytes in accordance with a predetermined scrambling code, forming the scrambled data bytes into a payload of a frame of data that also includes at least a code to descramble the scrambled data bytes, and scrambling the frame of data in accordance with a predetermined set-reset code to prevent loss of synchronization at the receiver and then transmitting the scrambled frame to the receiver over a transmission path.

7. The method of claim 6 further comprising the steps of at the receiver, receiving the scrambled frame of data, and descrambling the scrambled data bytes of the frame payload in accordance with the descrambling code contained in the frame, and outputting the descrambled result to an output.

8. The method of claim 6 further comprising the step of receiving the data packet from Internet facilities and processing the received data packet in accordance with a quality-of-service indicator contained in the packet.

9. A method of preventing the content of data that is to be transmitted to a receiver of data from disrupting the synchronization between a transmitter of the data and the receiver, said method comprising the steps of receiving the data from a source and at least then scrambling the data in accordance with a first scrambling code, forming the scrambled data into a frame of data, and scrambling the frame of data in accordance with a second scrambling code to prevent a disruption of such synchronization and transmitting the scrambled frame to the receiver.

10. The method of claim 9 further comprising the steps of at the receiver, receiving the frame of scrambled data and descrambling the received frame of scrambled data in accordance with the second scrambling code, and descrambling the scrambled data in accordance with the first scrambling code.

11. The method of claim 9 further comprising the step of including the first scrambling code in said frame of data.

12. The method of claim 9 further comprising the steps of receiving the data from a predetermined transmission system and processing the received data in accordance with a predetermined quality-of-service indicator contained in the received data.

*13. Apparatus for processing, in accordance with a simplified data link protocol, a datagram received from an Internet facility and supplying the processed datagram to Synchronous Optical NETwork (SONET) apparatus for transmission over an optical path, said datagram being associated with a predetermined quality of service (QoS), said apparatus comprising:*

*a simplified data link processor adapted to (1) receive the datagram from the Internet, (2) assign a size value to the datagram, in which the size value is determined as a function of the amount of data forming the datagram, and (3) store the datagram in a buffer selected as a function of a QoS indicator indicative of a level of priority assigned to the datagram, in which the contents of the selected buffer are then processed at a level commensurate with the assigned priority level, the simplified data link processor including:*

*first apparatus adapted to (1) generate a cyclic redundancy code (CRC) over the datagram stored in a buffer currently scheduled for processing, (2) insert the CRC, QoS indicator, and size value in a header section of a datagram, and (3) supply the resulting datagram to second apparatus; and*

*the second apparatus adapted to (1) receive the data forming the resulting datagram, (2) scramble the datagram in accordance with a particular scram-*

*bling code, and (3) supply the scrambled result to the SONET apparatus, the SONET apparatus including:*

*an assembler adapted to assemble the scrambled result and associated path overhead information into a payload; and*

*a scrambler circuit adapted to (1) scramble the payload and associated path overhead information and (2) output that scrambled result to the optical path.*

*14. The simplified data link apparatus of claim 13, wherein the process of scrambling the datagram in accordance with the particular scrambling code is characterized by a polynomial of* $1+x^2+x^{19}+x^{21}+x^{40}$.

*15. The simplified data link apparatus of claim 13, wherein the SONET apparatus further includes a path overhead processor adapted to generate the path overhead information, such that the path overhead information includes a descrambling code derived as a function of the particular scrambling code.*

*16. The simplified data link apparatus of claim 13, wherein the SONET apparatus further includes a path overhead processor adapted to generate the path overhead information such that the path overhead information includes a first part of a descrambling code derived as a function of the particular scrambling code and such that the path overhead information generated for a next succeeding payload includes a second part of the descrambling code.*

*17. Apparatus for processing a datagram received from Internet facilities and supplying the processed datagram to another transmission facility, said apparatus comprising:*

*a first scrambler adapted to (1) scramble the datagram starting with a current scrambling code to form a scrambled datagram, (2) determine a projected descrambling code that succeeds the current scrambling code by a predetermined amount of data, and (3) include the projected descrambling code in the transmission of the scrambled datagram to a receiver adapted to (a) receive the scrambled datagram, (b) form the projected descrambling code into a scrambling code, and (c) descramble the scrambled datagram as a function of the formed scrambling code.*

*18. A method of preventing loss of synchronization between a transmitter of data and a receiver of the data, the method comprising:*

*receiving data forming a data packet;*

*scrambling the data in accordance with a predetermined scrambling code;*

*combining the scrambled data with a code to descramble the scrambled data to form combined data;*

*scrambling the combined data to prevent loss of synchronization at the receiver; and*

*transmitting the scrambled combined data to the receiver over a transmission path.*

*19. The method of claim 18, further comprising, at the receiver:*

*receiving the scrambled combined data;*

*descrambling the scrambled data in accordance with the descrambling code contained in the combined data; and*

*outputting the descrambled result to an output.*

*20. The method of claim 18, comprising:*

*receiving the data packet from Internet facilities; and*

*processing the received data packet in accordance with a QoS indicator contained in the packet.*

*21. The method of preventing the content of data that is to be transmitted to a receiver of data from disrupting the synchronization between a transmitter of the data and the receiver, said method comprising:*

*receiving the data from a source;*

*scrambling the data in accordance with a first scrambling code;*

*scrambling at least the resulting first scrambled data in accordance with a second scrambling code to prevent a disruption of said synchronization; and*

*transmitting the resulting second scrambled data to the receiver.*

*22. The method of claim 21, further comprising, at the receiver:*

*receiving the second scrambled data;*

*descrambling the second scrambled data in accordance with the second scrambling code to recover the first scrambled data; and*

*descrambling the recovered first scrambled data in accordance with the first scrambling code.*

*23. The method of claim 21, comprising:*

*combining the first scrambled data and a code to descramble the first scrambled data to form combined data; and*

*scrambling the combined data with the second scrambling code.*

*24. The method of claim 21, comprising:*

*receiving the data from a predetermined transmission system; and*

*processing the received data in accordance with a predetermined QoS indicator contained in the received data.*

* * * * *